United States Patent [19]

Snider et al.

[11] Patent Number: 5,623,965

[45] Date of Patent: Apr. 29, 1997

[54] LOW EFFORT VACUUM VALVE ASSEMBLY WITH ROTARY ACTUATOR

[75] Inventors: Chris R. Snider; Curtis A. Stapert, both of Kokomo, Ind.

[73] Assignee: Delco Electronics Corporation, Kokomo, Ind.

[21] Appl. No.: 550,323

[22] Filed: Oct. 30, 1995

[51] Int. Cl.$^6$ .................................................... F15B 13/07
[52] U.S. Cl. ...................... 137/896.2; 137/353; 137/627; 137/636; 137/863; 137/867
[58] Field of Search ............................. 137/353, 596.2, 137/627, 636, 636.1, 863, 867

[56] References Cited

U.S. PATENT DOCUMENTS

| | | | |
|---|---|---|---|
| 3,073,341 | 1/1963 | Schernekau | 137/863 |
| 3,991,788 | 11/1976 | Kull | 137/863 |
| 4,046,159 | 9/1977 | Pegourie | 137/596.18 X |
| 4,466,456 | 8/1984 | Hansen | 137/596.2 |

FOREIGN PATENT DOCUMENTS

| | | | |
|---|---|---|---|
| 978613 | 4/1951 | France | 137/627 |
| 1015422 | 12/1965 | United Kingdom | 137/636.1 |

*Primary Examiner*—Gerald A. Michalsky
*Attorney, Agent, or Firm*—Jimmy L. Funke

[57] ABSTRACT

A rubber valve plate is sandwiched between a stator and a cover. Ports in the stator for coupling to a vacuum source and vacuum motors are aligned with poppets molded in the valve plate. A manifold in the plate joins regions surrounding the valves to couple the vacuum source to all the valves. Openings in the cover plate allow a dome of each poppet to protrude. A rotary actuator adjacent the cover is configured to selectively engage the domes to actuate certain poppets which are moved against the stator to close the port to vacuum or are allowed to move toward the cover to connect the port to vacuum.

10 Claims, 2 Drawing Sheets

LOW EFFORT VACUUM VALVE ASSEMBLY WITH ROTARY ACTUATOR

FIELD OF THE INVENTION

This invention relates to vacuum valves for selectively coupling a vacuum source to a plurality of outlets and particularly to such valves having a rotary actuator.

BACKGROUND OF THE INVENTION

Vacuum valves are used in systems requiring control of a source vacuum to outlet ports. In automotive climate control systems, the vacuum valves are typically an assembly that achieves valve operation by sliding or rotating a channeled pliable selector plate, usually made of a rubber material, over a rigid ported stator made of plastic or die-cast metal to provide the routing of the source vacuum.

The problems associated with such vacuum valves are as follows: 1) The sliding or rotating of the rubber selector plate on the stator typically has a frictional force associated with the motion. 2) There is usually a tolerance stack-up from the parts, as well as the material composition that can sometimes produce a borderline seal condition. 3) The associated break-away torque or force to operate the switch is usually temperature dependent. 4) The leak rate of the assembly is dependent on the clamping force of the components which can increase the frictional force. This is an undesirable condition, for it inhibits smooth operation of the valve.

SUMMARY OF THE INVENTION

It is therefore an object of the invention to minimize friction in a vacuum valve assembly and at the same time prevent leakage.

A valve assembly has a flat stator with ports for connection to a vacuum source and to various vacuum motors, a cover plate, a pliable valve plate sandwiched between the stator and the cover plate and having an integral movable poppet for each port, and a rotary actuator for selectively moving the poppets to open and closed positions. A vacuum manifold connects the ports subject to each poppet which can close off the vacuum and vent that port or close the vent and apply the vacuum to the port. The poppets move between the stator and the cover plate in a direction normal to the stator and have domes which protrude through openings in the cover plate. The actuator has its axis normal to the stator and has a configured surface adjacent the cover plate including means for engaging the domes to push the poppets toward the stator, and relief means in the surface for selectively allowing the poppets to move toward the cover. The friction of the domes on the actuator is relatively small and can be reduced further by capping the dome with a low friction material.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
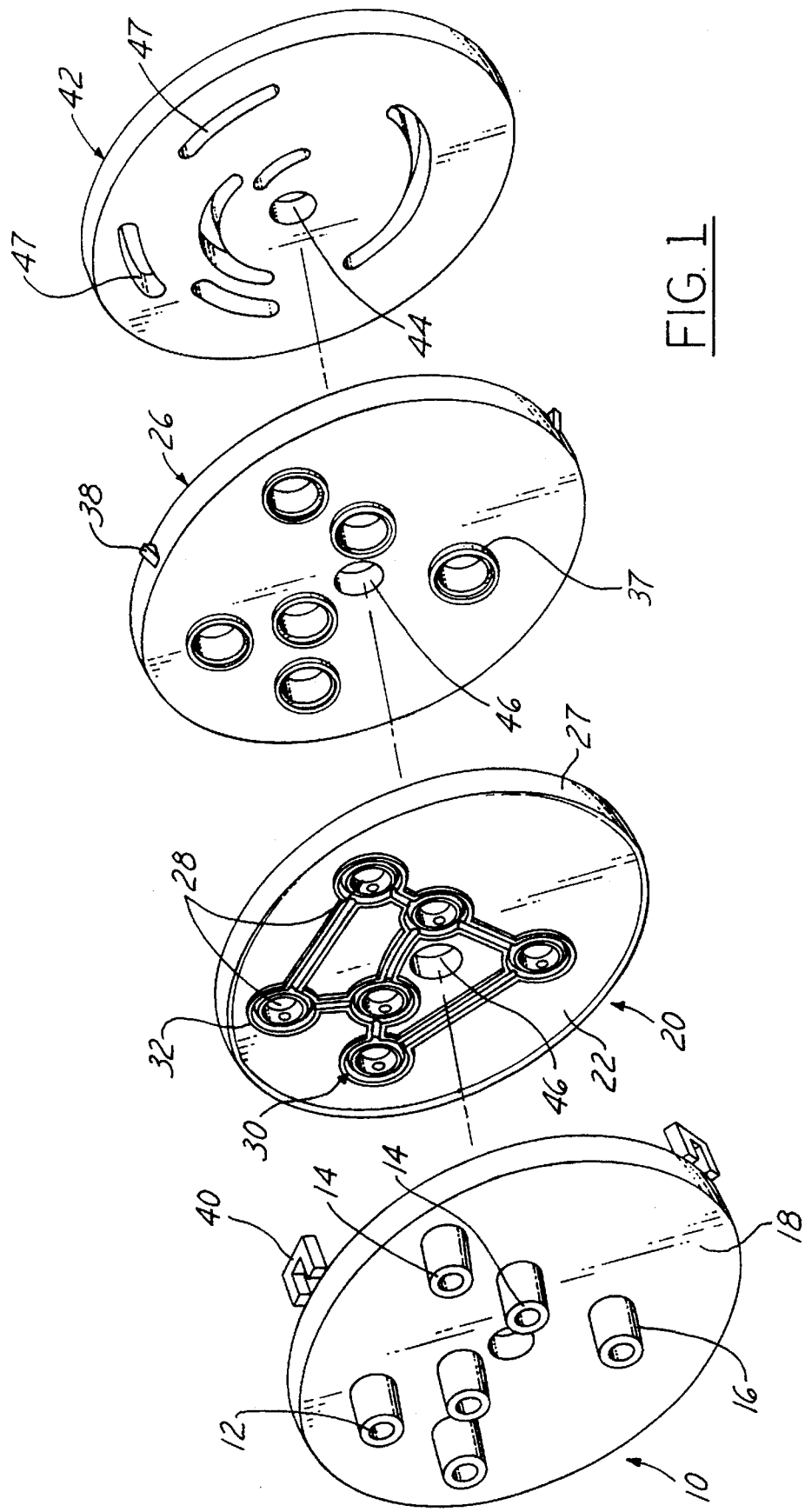
FIG. 1 is an exploded isometric view of a vacuum valve assembly according to the invention.

Referring to the drawings, a vacuum valve assembly is shown as comprising four generally disk-shaped molded parts which, when stacked together, function as a plurality of valves. Each valve comprises a port and a poppet which is actuated to open or close the port. Any one of the ports may be a source port connected to a vacuum source and the remainder are outlet ports connected to various vacuum motors.

Figure 2:
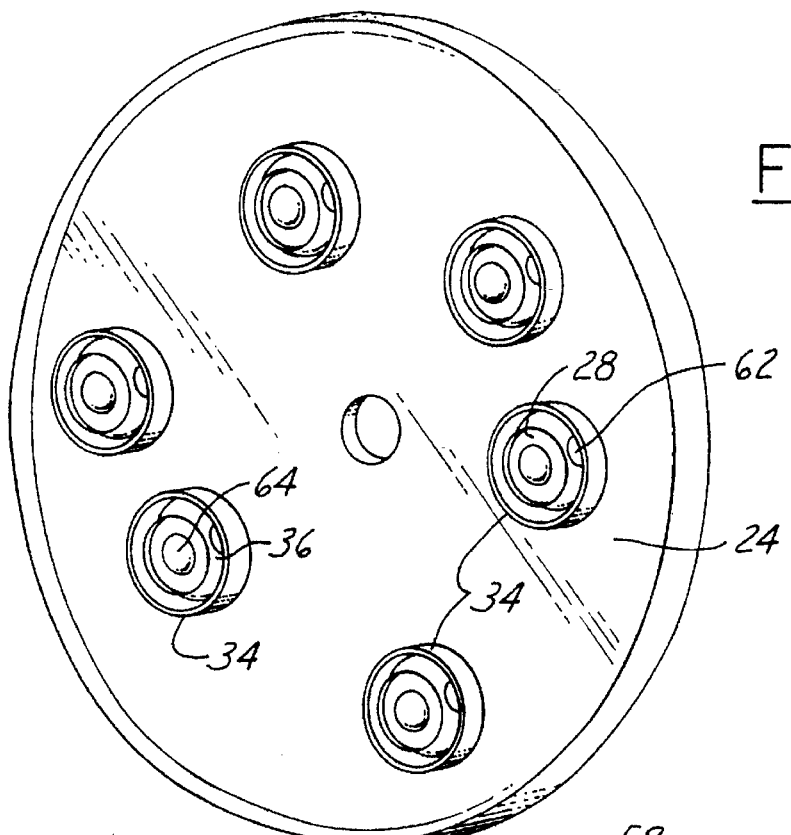
FIG. 2 is an isometric view of a valve plate of FIG. 1 showing the outer surface of the plate.

A stator 10 has a plurality of ports 12 and 14. The port 12 is arbitrarily selected as a source port for the purposes of description. Each port has a nipple 16 protruding from the outer face 18 of the stator for attachment of a vacuum hose. The inner face of the stator is flat. A valve plate 20 molded of pliable material such as neoprene rubber has an inner surface 22 adjacent the stator 10 and an outer surface 24 (FIG. 2) adjacent a cover 26. The body of the valve plate is disk-like and has a rim 27 which extends between the stator 10 and the cover 26. A plurality of poppets 28, integrally molded in the valve plate 20, are each aligned with a port 12 or 14. An integral seal 30 surrounds each poppet and comprises a first outer annular rib 32 on one side of the valve plate 20 which seals against the stator 10, and a second outer annular rib 34 on the other side of the valve plate seals against the cover 26. The cover has an opening 36 aligned with each poppet 28 and an inner ring 37 around each opening 36 and adjacent the rib 34. Lugs 38 on the rim of the cover mate with ears 40 on the stator 10 to hold the stator, the valve plate and the cover together as a sandwich.

An actuator 42 is mounted adjacent the cover 26 for rotation about a central axis which passes through the valve sandwich. The actuator has a central driving aperture 44 shaped to key to an actuator shaft or the hub of a control knob, not shown. The cover 26, valve plate 20 and stator 10 have circular apertures 46 on the central axis to accommodate the shaft or hub. The actuator 42 is a plate with arcuate slots 47, each aligned with one of the cover openings to operate the poppets 28.

A vacuum manifold 48 interconnects the first outer rib 32 of each valve. The manifold 48 comprises channels 50 formed in the side 22 of the valve plate and engage the stator. The channels extend from one seal 30 to another. Each outer rib 32 has at least one opening 52 connected to a channel 50 so that when vacuum is applied to the seal at one port, it will be coupled via the manifold to the seals at all the ports. Vacuum will then be applied at each port, provided that the poppet position allows it.

Figure 3:
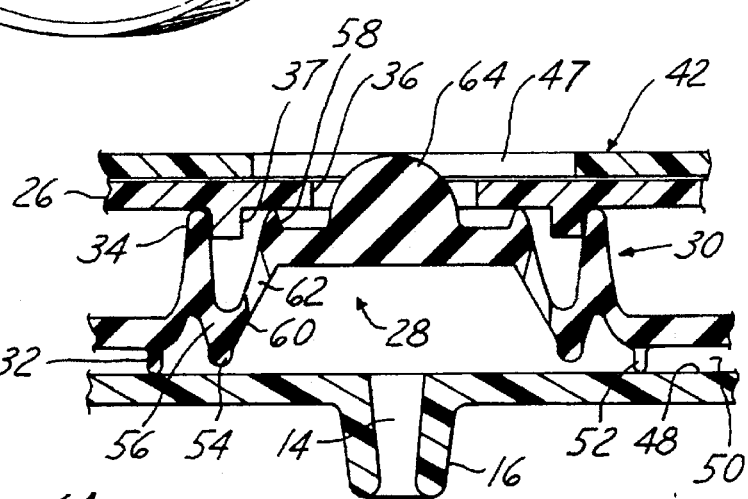
FIGS. 3 and 4 are cross sections of a portion of a single valve of the valve assembly in open and closed positions respectively, according to the invention.

The poppets 28 each reside within a seal 30 and have a first annular inner rib 54 surrounding a port 14, connected to the seal by a web 56 and movable between a valve closed position in sealing contact with the stator 10 (FIG. 4) and a valve open position spaced from the stator (FIG. 3). The poppet has a second annular inner rib 58 surrounding the opening 36 and movable between a valve closed position spaced from the cover and a valve open position engaging the cover. A web 60 connects the rib 58 to the rib 54 and contains vents 62 which pass through the web 60. In the case of the source port 12, however, the web will not include vents. At the center of the poppet, within the rib 58, a dome 64 protrudes up through the opening 36 in the cover.

Figure 4:
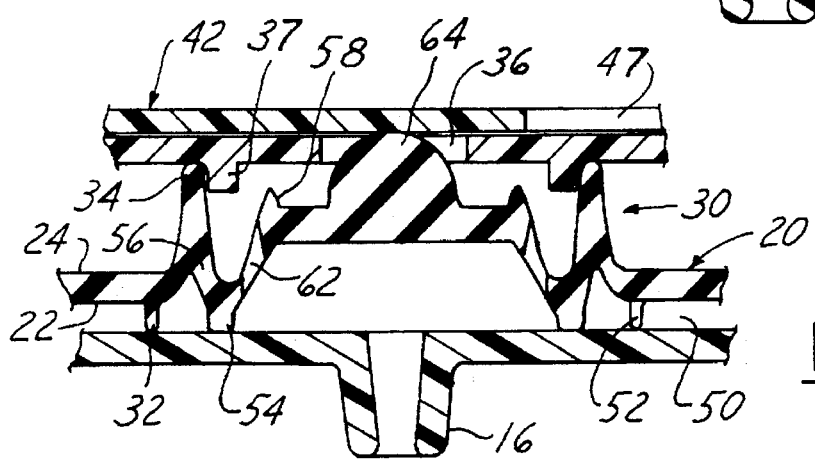

When the actuator 42 is positioned to cover the opening 36, as in FIG. 4, the dome 64 is positioned beneath the actuator and the first inner rib 54 is pushed into engagement with the stator. For an outlet port 14 this will seal off the port from the vacuum manifold 48. There will thus be an annular region between the outer seal 32 and the inner seal 54 which is exposed to vacuum from the manifold and indeed is part of the manifold since it couples adjacent channels 50. Any tendency of the rib 34 to slide toward the center when the dome is depressed is offset by the ring 37 on the cover which engages the rib 34. The vents 62 and the opening 36 couple atmospheric pressure to the port 14. For a source port 12 the rib 54 in the closed position isolates the vacuum source at the port from the manifold. The absence of vents prevents coupling the source to atmosphere.

When the actuator 42 is positioned with a slot 47 over the opening 36, the dome 64 is pushed up into the slot by the spring force in the webs, as in FIG. 3. Then the rib 54 is spaced from the stator 10 to couple the manifold to the port and the inner rib 58 will seal against the cover to prevent venting through the opening 36.

Thus by rotating the actuator to various positions certain valves can be opened and others can be closed on a selective basis, depending on the pattern of the arcuate slots 47 in the actuator. Friction force is minimized since only the small domes contact the moving actuator. It is contemplated that to further reduce the frictional force, each dome may consist of a harder durometer rubber than the rest of the valve assembly or may be fitted with a low-friction plastic cap.

Compared to prior vacuum valve assemblies in which a rubber selector plate slides on a stator, the linear motion of poppets and sliding contact with the poppet domes require less frictional force and enables more force to be directed to the seal instead of driving a selector. In addition the poppet configuration requires less seal area, thus improving reliability.

The embodiments of the invention in which an exclusive property or privilege is claimed are defined as follows:

1. A vacuum valve assembly for selectively connecting a plurality of ports to a vacuum source comprising:

a stator having a source port for coupling to a vacuum source and a plurality of outlet ports;

a manifold for connecting the source port to a region adjacent each outlet port;

a valve plate of pliable material in contact with the stator and having integral movable poppets aligned with respective outlet ports and an integral movable poppet aligned with the source port for selectively isolating the manifold from the source port; and an actuator for selectively controlling the position of each poppet so that the corresponding outlet port is either coupled to or isolated from the adjacent region, thereby selectively coupling the source port to each outlet port.

2. The invention as defined in claim 1 wherein each poppet has a vent to atmosphere which is effective to vent the corresponding port when the port is isolated from the vacuum source.

3. The invention as defined in claim 1 wherein the manifold comprises a channel in the valve plate extending between the region of the source port and regions adjacent the outlet ports.

4. The invention as defined in claim 1 wherein the actuator moves parallel to the stator and is effective to move each poppet in a direction normal to the stator to control the corresponding outlet port.

5. The invention as defined in claim 1 wherein:

the poppets are biased away from the stator;

the actuator is a rotary member having an axis normal to the stator; and the actuator has a surface for pressing the poppets against the stator and relief portions for selectively allowing the poppets to release from the stator.

6. The invention as defined in claim 1 wherein:

the valve plate includes flexible seals containing poppets aligned with respective outlet ports;

each seal has an outer annular rib in permanent sealing contact with the stator, and a central poppet movable into contact with the stator and having an inner annular rib for sealing around the corresponding port; and the vacuum manifold is connected to the area between the two ribs so that the port is coupled to the manifold when the inner rib on the poppet is spaced from the stator and the port is isolated from the manifold when the inner rib on the poppet is in sealing contact with the stator.

7. The invention as defined in claim 6 wherein:

each poppet has a vent coupled to a passage to atmosphere; and each poppet has a third rib for closing the passage when the inner rib is spaced from the stator.

8. A vacuum valve assembly for selectively connecting a plurality of ports to a vacuum source comprising:

a stator having a source port for coupling to a vacuum source and a plurality of outlet ports;

a manifold for connecting the source port to a region adjacent each outlet port;

valve plate of pliable material in contact with the stator and having integral movable poppets aligned with respective outlet ports;

an actuator for selectively controlling the position of each poppet so that the corresponding outlet port is either coupled to or isolated from the adjacent region, thereby selectively coupling the source port to each outlet port; and wherein:

the assembly includes a cover plate spaced from the stator in contact with the valve plate;

openings in the cover plate aligned with the outlet ports;

the valve plate includes flexible seals containing poppets aligned with respective outlet ports;

each seal has a first outer annular rib in permanent sealing contact with the stator and a second outer annular rib in permanent sealing contact with the cover;

each seal has a central poppet movable between the stator and the cover and having a first inner annular rib for sealing around the corresponding port and a second inner rib for sealing around the opening; and the manifold is connected to an area between the first outer rib and the first inner rib so that the manifold is coupled to the port when the poppet is positioned against the cover and the manifold is isolated from the port when the poppet is positioned against the stator.

9. The invention as defined in claim 8 wherein the seal has a vent coupling the port with the region between the second outer rib and the second inner rib, whereby the port is vented to the opening in the cover plate when the poppet is positioned against the stator and the port is isolated from the opening when the poppet is positioned against the cover.

10. The invention as defined in claim 8 wherein:

the poppets have domes protruding through the respective openings in the cover plate; and the actuator selectively engages the domes to operate the poppets.

* * * * *